W. F. CHANNING & M. G. FARMER.
Electro-Magnetic Fire-Alarm Telegraphs for Cities.
No. 6,241. Reissued Jan. 19, 1875.
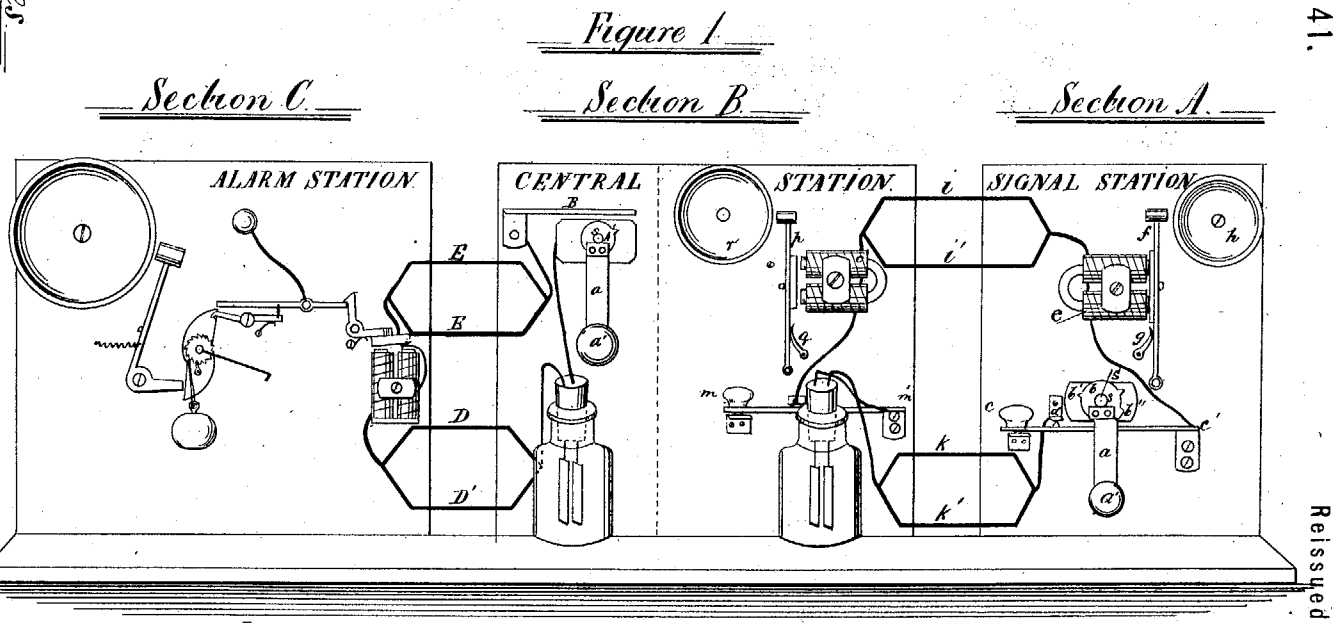
Witnesses.
T. C. Smith
Harry Coleman.
Inventor.
William F. Channing
Moses G. Farmer
By J. P. Sickels their atty
N. PETERS, Photo-Lithographer, Washington, D. C.

UNITED STATES PATENT OFFICE.

WILLIAM F. CHANNING, OF PROVIDENCE, RHODE ISLAND, AND MOSES G. FARMER, OF SALEM, MASSACHUSETTS.

IMPROVEMENT IN ELECTRO-MAGNETIC FIRE-ALARM TELEGRAPHS FOR CITIES.

Specification forming part of Letters Patent No. 17,355, dated May 19, 1857; extended seven years; Reissue No. 6,241, dated January 19, 1875; application filed December 18, 1874.

DIVISION C.

*To all whom it may concern:*

Be it known that we, WILLIAM F. CHANNING, of Providence, county of Providence, State of Rhode Island, and MOSES G. FARMER, of Salem, Essex county, State of Massachusetts, have invented certain new and useful Improvements embodied in the electric telegraph and telegraphic mechanism, which we call the American Fire-Alarm Telegraph; and we do hereby declare that the same is fully described and represented in the following specification and the accompanying drawings.

The devices connected with said telegraph, which it is intended to claim in this division of this reissue as new, relate, first, to an electric circuit and one or more sounding mechanisms connected therewith, or with a dependent circuit, and several circuit breaking and closing mechanisms, designed and adapted to give automatically certain different determinate recorded or audible signals, each circuit-breaker acting to thus signalize its own number or other designation of itself; second, to an electric circuit, a sounding or recording mechanism, and several circuit-breakers, constructed and organized as above specified, and a device whereby, after the giving of such signals, the said circuit-breaker shall automatically be stopped in position to restore the circuit to its normal condition, and also, if desired, where it may correctly commence a repetition of the signal by a direct forward movement; and, third, a circuit-breaker or mechanism having, as a part of its permanent organization, two or more groups of circuit-breaking or circuit-closing points, the several groups being separated by spaces greater than the spaces which separate the individual points of the groups, whereby an electric circuit may be operated automatically to give multiplex determinate telegraphic signals; but, in order that the construction and operation of these several devices may be fully and readily understood, we will describe the said telegraph in all its parts.

The accompanying drawings represent, on a small scale, a general view of the American fire-alarm telegraph or telegraphic-alarm system, embracing the signal-station, shown by section A; the central station, shown by section C; the signal-circuit, the position of which is shown by the lines *i i′ k k′*, and the alarm-circuit, the position of which is shown by the lines D D′ E E′. These drawings also show the connection and mutual dependence of the said several parts.

The object of the American fire-alarm telegraph is to give an instantaneous and definite alarm, either general or local, in a city or town, in case of fire, indicating the locality of the fire.

The object of the signal-station is to indicate the existence and locality of a fire in its neighborhood to the central station, or to other signal-stations, or both. The number of signal-stations should, therefore, be multiplied in proportion to the size of the city or town, in order to place one within a suitable distance of every house; and such stations are to be organized to give signals differing from one another, so that each shall indicate uniformly its own location by signalizing its number or other designation; and for fire-alarm purposes it is essential that the signals be either recorded or audibly sounded.

The object of the central station is to receive intelligence of the existence and locality of a fire from a signal-station in the neighborhood of the fire, and to give a corresponding public alarm through the alarm-bells; and, if desired, also communicate with the signal-stations by means of machinery operated or controlled by telegraphic action or influence emanating from the central station.

The object of the alarm-station, which is usually a belfry or bell-tower, is to give a public alarm by means of blows upon a bell struck by machinery, the action of which is controlled from the central office or station by telegraph. Instead of a bell, other suitable mechanism for producing sound may be substituted.

The function of the signal-circuit is to connect, telegraphically, several signal-stations with the contral station, and with each other, or simply to connect several signal-stations with each other, for signalizing alarms of fire.

The function of the alarm-circuit is to connect, telegraphically, one or more alarm-stations with a central station, and with each other, so as to combine such stations into an alarm system for giving public alarm in case of fire.

We will now describe in detail the several parts of the machinery and apparatus belonging to the system, in order to enable those skilled in electro-magnetic mechanism to construct and use our invention.

Section A, Figure 1, represents the apparatus of a signal-station. *h* represents a bell or other sonorous piece of metal, which is struck by a hammer on the end of the armature *f* of the electro-magnet *e*. *g* is a spring, which forces the armature-lever *f* back against the bell *h* when the electro-magnet *e* is discharged. *c c′* is a break-circuit key, closing the circuit when pressing against the anvil *d*. This key is operated by the action of the circuit-wheel *b*, which is mounted on a shaft, *s*, and is turned or caused to rotate by means of the crank *a*, either with or without the intervention of intermediate gearing.

It is obvious that, in order to give the signals correctly, it is only necessary that the wheel shall be turned at a uniform rate of motion.

Each circuit-wheel is furnished, as shown, with a certain definite number of points for breaking and closing the circuit a certain number of times in a determinate order, with definite intervals between the breaks and closings, whereby at each revolution of the wheel, at a uniform rate of motion, there will be given, in or by the recording or sounding mechanism, a certain determinate recorded or audible signal or series of signals, and the several wheels being organized to give signals differing from one another, each invariably indicating its own locality.

Upon the circuit-wheel may be two groups of teeth, which groups are separated from each other by spaces greater than the spaces separating the individual teeth of the groups.

One of the groups may, by the number of its teeth, represent the number of the fire-district in which the signal-station is located. The other group may, by conventional agreement, represent the number of the signal-station itself in that district.

Instead of the arrangement for breaking and closing the circuit, which has been above described, any equivalent or known form and arrangement of circuit-breaker and spring may be used, constructed and organized to produce a similar effect.

Instead of a closed circuit, an open circuit may be used by the substitution of open-circuit apparatus and magnets, and the bells being struck, if preferred, by direct action, instead of the reaction of a spring.

The crank *a* of the circuit-wheel is weighted at *a′*, so that the wheel, after it is put in motion to break the circuit for the purpose of signalizing, will automatically be stopped in position to close the circuit, and keep it closed, when the wheel is at rest, the groups of teeth *b′ b″* being kept in such position that they shall not depress the key *c c′* so as to break the circuit; thus the circuit is automatically restored to its normal condition after being broken for the purpose of signalizing. It is also evident that by the action of the weighted crank the wheel will be automatically stopped in the proper position to correctly commence the giving of a repetition of the determinate signal, which the wheel is specially organized to give, and that such signal may be commenced and given by moving the wheel immediately and directly forward from the position at which it has been thus automatically stopped. Instead of turning the circuit-wheel by hand by means of the crank *a* the circuit-wheel may be caused to rotate and stop, by any known force or mechanical contrivance.

The signal-circuit consists of electrical conductors extending between and passing through several signal-stations, and usually through a central station, embracing all and uniting all such signals and the receiving instruments at such central station, into a system for signalizing alarms of fire. It may consist, however, of conductors connecting and including several signal-stations alone, without including a central station, so that an alarm would be signalized from one to all the others by means of the circuit-wheel in the station giving the alarm, and by means of the magnet and bells in all the others.

The conductors of the signal-circuit consist usually of telegraphic wires suitably insulated. It is advisable to use duplicate wires, Fig. 1, *i i′ k k′*, following different routes between all the stations, so as to lessen greatly the probability of interruption from accident or design. In some cases threefold or manifold wires might be used.

To make interference with the circuits more difficult the use of the ground as part of any circuit may, with advantage, be entirely dispensed with.

In the drawings, the conductors of the signal-circuit *i i′ k k′* are represented as connecting only one signal-station with the central station. It will be understood that when two or more signal-stations are inclined in the same circuit the conductors of the signal-circuit will connect not only the nearest signal-station with the central station, but neighboring signal-stations with each other.

There may be several signal-circuits, radiating, like the petals of a flower, from the central station, or otherwise, and on each of the signal-circuits there are to be several signal-stations, organized to give definite and different signals, each thereby invariably indicating its own locality, or there may be but a single signal-circuit, having upon it several such signal-stations, whereby signals from each station are transmitted to all the others, the object being to bring all parts of a municipality into communication with a center, or with each other, or both—a signal from any station indicating to the others the locality of such signalizing-station, and by the means described a high municipal organization may be effected.

In furtherance of this object, a city or town provided with this system may be conveniently divided into several fire-districts, in each of which may be one or more signal-stations, duly numbered or otherwise designated, each signal-station being organized to signalize its own number or other designation of itself. The receiving-apparatus at the stations consists, in general, of an electro-magnet, with its armature, hammer and spring, and a small bell or its equivalent. If desirable, a "dot-and-line" register or recording-instrument may be added, in any of the well-known ways. There may be, also, in the same circuit with the circuit-breaker *b*, a key, *m m'*, which can be conveniently used both to correspond with the signal-stations and also to indicate, by the number of taps on the key *m m'*, and by the corresponding action of the armatures and bells or other receiving-instruments, for sounding or recording signals at the other stations, the number of the station which originated the alarm.

The transmitting-apparatus of the central station consists, in general, of a galvanic battery, C, (Section B,) or its equivalent, an automatic or other apparatus, A A' B, for connecting at suitable times and intervals the alarm-battery C with the wires E E' D D' of the alarm circuit or circuits. A simple form of this apparatus may be a crank, A, a circuit-wheel, A', and spring B, the circuit-wheel having a number of teeth, A', corresponding with the number of the district to be indicated on the bells, and these teeth, by the rotation of the wheel, coming into contact with the spring B, and thereby connecting one pole of the battery C with the alarm-circuit D D', the other pole of the battery C being already connected with the return part (so to speak) E E' of the alarm-circuit.

Where a city is of great extent, or where for any reason it may be desirable, two or more central stations may be used, instead of a single central station. Central stations may also sometimes be conveniently combined with an alarm-station.

The alarm-circuit consists of electrical conductors extending between and including one or more alarm-stations and the transmitting-instruments of the central station. These conductors are usually duplicate and well-insulated telegraphic wires between the stations, as in the signal-circuit already described, their object and effect being to establish telegraphic communication between the stations, and to connect the functions of the transmitting-instruments of the central station with those of the alarm machinery at the alarm-stations. There may be several alarm-circuits, each including several alarm-stations, in the same way as there may be several signal-circuits.

In the drawings, the conductors of the alarm-circuit, Fig. 1, D D' E E', are represented as connecting one alarm-station with the central station. If more than one alarm-station is included in the same alarm-circuit, it will be understood that the conductors of the alarm-circuit will connect not only the nearest alarm-station with the central station, but neighboring alarm-stations with each other.

Two or more alarm-stations being included in the same alarm-circuit, the bells at such stations may strike synchronously in obedience to any telegraphic impulse sent to them from the central station through the proper apparatus. Where there are two or more alarm-circuits radiating from the central station, they may be united at the central station, so as to constitute really but a single electrical circuit, or the same electrical impulse may be sent over them, each in rapid succession, whereby a great saving of electrical power may be attained, and the practical result of nearly synchronous action at the alarm-stations be still preserved. In either case they constitute one alarm system. The alarm-circuits may be divided or varied in arrangement for purposes of convenience and economy of construction, and each circuit may include any desirable number of alarm-stations, but they still constitute, if connected with the central station, one alarm system, and a part or the whole of this system may be called into action at once, according as it is desired, to give a partial or general alarm of fire in a city, for the better accomplishment of the purposes of municipal organization set forth.

For the sake of exhibiting the machinery, in its connection, a simple form of the electro-magnetic alarm-bell apparatus, mentioned above, is represented in the drawings, but no detailed description thereof is deemed necessary here.

To show the operation and connection of the several parts of our system, suppose a fire is discovered in the vicinity of the signal-station represented in section A, an authorized person (say, a watchman) opens the signal-box and turns the crank *a* moderately fast. The teeth *b' b''*, on the circuit-wheel, in the course of its revolutions, depress the key *c c'*, and in this manner break and restore the circuit at definite intervals and a definite number of times, the key returning by its own elasticity, and thus closing the circuit when not depressed by the teeth *b' b''*. The breaking and restoring the circuit by the operation of the signal-wheel *b* and key *c c'* causes the electro-magnet and armature at the central station, by repeated strokes on the bell *r*, to indicate to the operator there the number of the district and station whence the alarm originates, and also gives the like indication at each signal-station on the line. The operator at the central station, upon thus learning the existence and locality of the fire, puts in motion the transmitting apparatus A A' B, and thereby causes the bells at the alarm-stations to indicate, by the number of their strokes, the locality whence the alarm originates.

The operator may also tap on the key *m m'* the number of the signal-station originating the alarm, and thereby repeat the indications thus given on the line where the alarm originates over all the other lines, or telegraph any other intelligence. The firemen may thus be able at once to take their engines by the nearest route to the fire.

It has been stated that, for the sake of more perfect security, it is better to construct both the signal and alarm circuits with double wires running by different routes, as represented at *i i' k k'* and E E' D D'. The arrangement of these duplicate conductors may be varied for open or closed circuits, in connection with the apparatus at the stations, in modes which will readily suggest themselves to any person conversant with electro-magnetic telegraph apparatus.

The conductors of the American fire-alarm telegraph may be carried duly insulated on posts through the streets or under ground; but may be preferably carried over the tops of houses, where they are less liable to injury.

What we claim in this division of this reissue is—

1. A signalizing apparatus, consisting of an electric circuit, a sounding or recording mechanism, and several automatic circuit-breakers adapted to give determinate and different signals, substantially as described.

2. A signalizing apparatus, consisting of an electric circuit, a sounding or recording mechanism, and several automatic circuit-breakers adapted to give determinate and different signals, substantially as described, and a device, whereby the several circuit-breakers, after being put in motion to break or close the circuit for signalizing, shall automatically be stopped in position to restore the circuit to its normal condition or to correctly commence a repetition of the signals, as described.

3. A signalizing apparatus, consisting of an electric circuit, a sounding or recording mechanism, and an automatic circuit-breaker adapted to give determined signals, and a device, whereby said circuit-breaker, after the giving of such a signal, shall automatically be stopped in such a manner that a signal may be repeated by a direct forward movement, as described.

4. An electric circuit and a circuit-breaker, permanently organized with two or more groups of circuit-breaking or circuit-closing points, the several groups being separated by spaces greater than the spaces separating the individual points of the groups, substantially as and for the purpose described.

5. The combination, with the same electric circuit or dependent circuits, of a manual circuit-breaking key for general telegraphing, and an automatic circuit-breaker adapted to give determinate signals, substantially as described.

WM. F. CHANNING.
MOSES G. FARMER.

Witnesses:
J. P. FITCH,
JAS. M. GARDINER.